H. GUYER.
APPARATUS FOR OPERATING THE BLOW-OFF VALVES OF CENTRIFUGAL COMPRESSORS OR PUMPS.
APPLICATION FILED JULY 8, 1913.
1,241,372.
Patented Sept. 25, 1917.
2 SHEETS—SHEET 1.
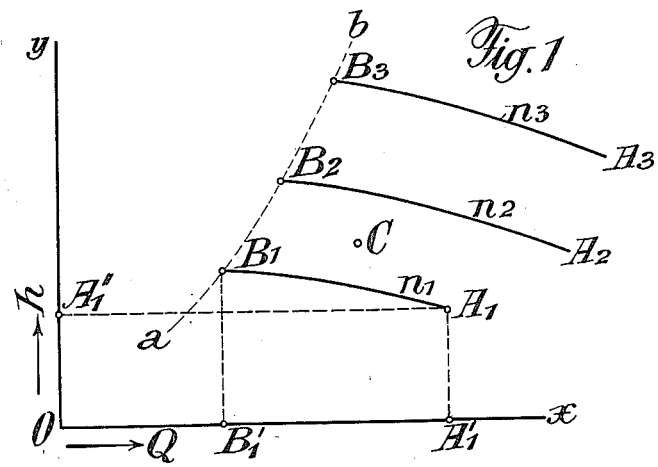
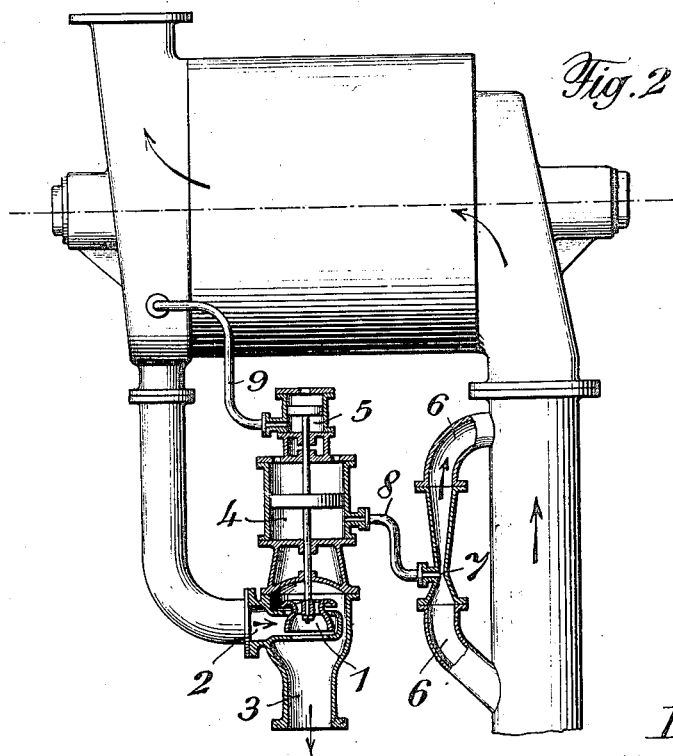
Inventor:
Hans Guyer.
By [signature]
Attorney.

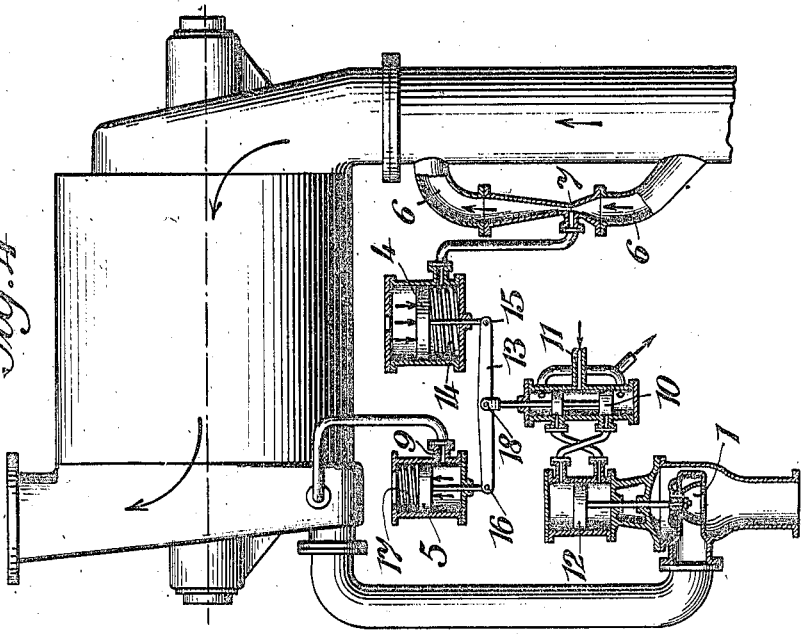
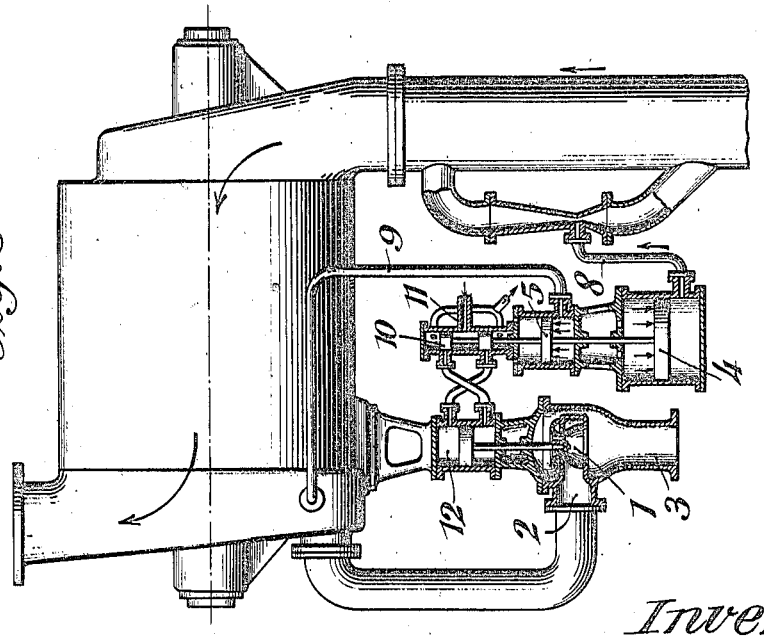

UNITED STATES PATENT OFFICE.

HANS GUYER, OF ZURICH, SWITZERLAND, ASSIGNOR TO AKTIENGESELLSCHAFT DER MASCHINENFABRIKEN ESCHER, WYSS & CO., OF ZURICH, SWITZERLAND.

APPARATUS FOR OPERATING THE BLOW-OFF VALVES OF CENTRIFUGAL COMPRESSORS OR PUMPS.

1,241,372.     Specification of Letters Patent.     Patented Sept. 25, 1917.

Application filed July 8, 1913. Serial No. 777,904.

*To all whom it may concern:*

Be it known that I, HANS GUYER, a citizen of the Swiss Republic, residing at No. 19 Hardturmstrasse, in Zurich, Switzerland, have invented certain new and useful Improvements in Apparatus for Operating the Blow-Off Valves of Centrifugal Compressors or Pumps, of which the following is a specification.

The present invention relates to a process, and to an apparatus for carrying into effect said process, for the operation of a blow-off or return valve for centrifugal compressors and pumps.

In the accompanying drawings,

Figure 1 is a diagram illustrating the process and hereinafter fully described.

Figs. 2, 3 and 4 illustrate three forms of apparatus by which the process is carried into effect, and which are hereinafter fully described.

It is well known that with a certain speed of rotation in a delivering machine of this kind, stability only exists when the increase in pressure does not rise above a certain figure and the quantity to be delivered does not sink below a certain figure. If, in a diagram with right-angled coördinates, in which the quantity of fluid flowing through the compressor is represented as abscissa and the pressure increase as ordinate, and these limit values for the stability are plotted for different speeds of rotation, these limit values will lie on a certain curve which may be termed the "stability limit curve." Fig. 1 shows a diagram of this kind. In the direction of the axis O—X the quantity Q delivered in the time unit is plotted, and in the direction of the axis O—y the appertaining pressure increase $h$ is plotted. For a certain speed of rotation $n_1$ the curve $A_1$—$B_1$ is the graphic illustration for the mutual dependence of the quantity Q of fluid flowing through the compressor upon the pressure increase $h$ and vice versa. Should the pressure rise from the value $A_1'$—$A_1$ to the value $B_1'$—$B_1$, then the quantity delivered sinks gradually from the commencing value O—$A_1'$ to the value O—$B_1'$. If now the delivery pressure rises above the value $B_1'$—$B_1$, then, in accordance with experience, a state of unstable equilibrium will be established. In other words the centrifugal compressor or pump begins to "pump".

Therefore for the speed of rotation $n_1$, the point $B_1$ is the boundary point between the stable and the unstable condition of the quantity of fluid flowing through the compressor. For other speeds of rotation $n_2$ and $n_3$ a similar curve $A_2$—$B_2$ or $A_3$—$B_3$ may be plotted within the range of stability. The points $B_1$, $B_2$ and $B_3$ lie on a curve $a$—$b$, that is to say the stability limit curve. The object of the present invention is to automatically open a blow-off or return valve or a similar member such as a slide flap or the like connected to the compressor, as soon as the conditions of delivery return out of the range of stability and cross the curve $a$—$b$. Should a point, for instance C, representing the momentary delivery for any speed of rotation, lie to the right of the limit curve $a$—$b$ in Fig. 1, which implies perfect stability of the delivery, then the blow-off or return member remains closed. Should the delivery quantity sink, or the pressure rise, or should both occur simultaneously, whereby the characteristic point C in the diagram is moved to the left or upward or in an intermediate direction, then according to the present invention, the blow-off valve should open when the point C goes beyond the limit curve $a$—$b$. Of course the opening will not coincide absolutely or exactly with the curve $a$—$b$; it is sufficient if the opening occurs at a condition whose graph lies in the neighborhood of this curve. From the previous introduction it is evident that the devices causing the opening must be dependent both upon the delivery quantity Q and also upon the pressure increase $h$ in the delivering machine. It has hitherto been known that for a certain speed of rotation a critical point with reference to the "pumping" occurs. It was however not known that in general these points lie on a curve known as the stability limit curve and that the automatic devices for preventing the "pumping" should render it possible to consider the whole limit curve and not only one point of same.

Figs. 2 to 4 show examples of apparatus suitable for operating the blow off valve in the manner of the present invention.

In Fig. 2, 1 is the blow-off valve whose casing is in connection through the piping 2 with any one pressure stage of a centrifugal compressor preferably with a pressure piping, and through the pipe 3 with a low pressure stage or the suction piping or the atmosphere. Should pressure rise or the quantity of the substance for instance air to be delivered, fall in such a manner that the point illustrating this momentary delivery in the pressure volume diagram Fig. 1 falls to the left or over the curve $a$—$b$ then the blow-off valve 1 in Fig. 2 should be opened. For this purpose the valve 1 is brought into communication with two auxiliary power machines 4 and 5. Of these machines the first is connected with a Venturi meter 7 which is built in the suction piping 6 of the compressor, in which meter during normal delivery there exists a certain vacuum with relation to the outer air. This vacuum operates on the lower side of a piston of the auxiliary machine 4 while the same piston is loaded above by the atmosphere. In the same way the piston of the auxiliary power machine 5 is loaded above by the atmosphere and below by the pressure of the substance to be delivered on emerging from the compressor. For this purpose the space below the piston of the auxiliary machine 5 is connected by means of the pipe 9 with the high pressure space of the compressor. The diameter of the cylinders 4 and 5 can be just so determined that the pressures acting on their pistons during normal working will hold the valve 1 closed. Should the pressure in the compressor rise above a certain limit, the piston 5 is raised; and should the delivery quantity fall and with it the vacuum in the Venturi meter 7, that is to say, if the absolute pressure under the piston of the power machine 4 rise above a certain limit, then the piston in the cylinder 4 is raised. Both alterations of the conditions cause the valve 1 to rise and consequently an outflowing or overflowing of the delivery substance out of the pressure space toward a place of lower pressure. During this operation caused by one piston the other piston is simply dragged along. An oppositely directed motion occurs when the pressure in the condenser and therefore simultaneously the pressure under the piston 5 drops, or when the delivery quantity rises and therefore the absolute pressure under the piston 4 drops. Should the pressure and the quantity of fluid flowing through the compressor rise or fall simultaneously, then their effects on the two power machines 4 and 5 can neutralize each other so that the valve 1 does not move. It may be imagined that the pressure and the quantity of fluid flowing through the compressor could rise together in such a manner that the point illustrating their momentary condition moves along the curve $a$—$b$ of Fig. 1. As long as the point remains to the right of this curve, no blowing-off will occur, but this only takes place as soon as it has reached or crossed the curve $a$—$b$ after having moved to the left or upward.

According to Fig. 3 wherein the air discharged at the blow-off valve is returned by pipe 3 to the inlet end of the compressor, the two auxiliary power machines 4 and 5 operate on a controlling valve 10 which allows of the passage of the auxiliary pressure fluid entering through the pipe 11 passing either above or below the piston of a third auxiliary power machine 12, which on its part opens or closes the overflowing valve 1.

A more sensitive arrangement is shown in Fig. 4. The pistons of the auxiliary machines 4 and 5 illustrated in Fig. 2 here operate by means of a double lever 13 on the controlling valve 10 of the third auxiliary power machine 12.

The piston positions of the auxiliary machines 4 and 5 shown in Fig. 4 should correspond to the conditions $B_1$ on the curve $a$—$b$ in Fig. 1 with the speed of rotation $n_1$. Should the delivery quantity flowing through the suction pipe 6 and the Venturi meter 7 rise, and therewith the absolute pressure under the piston 4 drop, then the outer atmosphere has the tendency to move this piston and thus the right hand end 15 of the double lever 13 downward against the action of the spring 14, so that the double lever 13 rotates momentarily about its left hand end 16 in a clockwise direction. Thereby sinks the controlling valve 10 which allows the pressure liquid to flow over the piston of a third auxiliary power machine 12 whereby said piston presses the outflow valve 1 still tighter onto its seating than previously. The same occurs when, with constant speed of rotation $n_1$ and constant delivery quantity $O$—$B_1'$ Fig. 1, the pressure drops below the momentary amount $B_1'$—$B_1$. The piston 5 in Fig. 4 thereby sinks under the influence of the loading spring 17 and rotates the lever 13 about the momentarily fixed point 15 in an anti-clockwise direction, lowers the controlling valve 10 and allows pressure oil to enter over the piston 12. Only when the piston 4 alone, or the piston 5 alone are sufficiently raised, which occurs in consequence of a reduced delivery quantity or increased pressure rise, is the controlling valve 10 again brought back into its middle position. This position always corresponds to a point in the curve $a$—$b$ in Diagram 1. Should the delivery quantity sink further or the pressure rise further, then the controlling valve 10 is raised out of its middle position and allows pressure liquid to enter under the piston 12 whereby this is raised and the blow-off valve 1 is opened. The controlling valve 10 can, however, remain in its middle position and the blow-off valve 1 can remain closed, when the piston 4, in consequence of an increase in delivery quantity, sinks, but the piston 5, in consequence of simultaneous increase of pressure in the condenser, sufficiently rises. The lever 13 rotates hereby in a clockwise direction about its center pivot 18 which, however, does not move vertically. An alteration of this kind of the delivery corresponds in the diagram Fig. 1 to a sliding of the characteristic point C along the curve $a$—$b$ from the point $B_1$ toward the point $B_3$.

Of course other forms of construction may be employed and return guide rods may be built in, in a known manner without altering the nature of the present invention.

What I claim is:—

1. In a centrifugal compressor or pump, the combination with a blow-off valve, of controlling mechanism for said valve, means for placing said mechanism under the influence of the delivery pressure and means for placing said mechanism under the influence of the quantity of fluid flowing through the compressor, so that the blow-off valve will be opened by said controlling mechanism at all speeds whenever the point indicating the momentary delivery in the quantity pressure diagram falls on that side of the stability limiting curve where pumping or surging occurs.

2. In a centrifugal compressor or pump, the combination with a blow-off valve, of controlling mechanism for said valve comprising means movable under the influence of the delivery pressure, means movable under the influence of the quantity of fluid flowing through the compressor, and means for transmitting the movements of said means to said valve, so that the valve will be opened by said controlling mechanism at all speeds whenever the point indicating the momentary delivery in the quantity pressure diagram falls on that side of the stability limiting curve where pumping or surging occurs.

3. In a centrifugal compressor or pump, the combination with a blow-off valve, of controlling mechanism for said valve comprising power means for adjusting said valve, means movable under the influence of the delivery pressure, means movable under the influence of the quantity of fluid flowing through the compressor, and means for transmitting the movements of said means to said power means, so that the valve will be opened by said controlling mechanism at all speeds whenever the point indicating the momentary delivery in the quantity pressure diagram falls on that side of the stability limiting curve where pumping or surging occurs.

4. In a centrifugal compressor or pump, the combination with a blow-off valve, of a power piston, means for placing said power piston under the influence of the delivery pressure, a second power piston, means for placing said second power piston under the influence of the quantity of fluid flowing through the compressor or pump, and mechanism for transmitting the movements of both said power pistons to act upon said valve whereby the valve is adjusted so as to prevent "pumping".

5. In a centrifugal compressor or pump, the combination with a blow-off valve of a power piston, means for placing said power piston under the influence of the delivery pressure, a second power piston, means for placing said second power piston under the influence of the quantity of fluid flowing through the compressor an auxiliary power machine for adjusting said blow-off valve, an auxiliary pressure fluid controlling valve for operating said auxiliary power machine, and means for causing the movements of both said power pistons to act upon said controlling valve.

6. In a centrifugal compressor or pump, the combination with a blow-off valve, of a power piston, means for placing said power piston under the influence of the delivery pressure, a second power piston, means for placing said second power piston under the influence of the quantity of fluid flowing through the compressor or pump, an auxiliary power machine connected with the blow-off valve and means for controlling said auxiliary power machine from the two power pistons, whereby the blow-off valve is opened at all speeds whenever the point indicating the momentary delivery in the quantity-pressure diagram falls on that side of the stability limit curve where pumping or surging occurs.

7. In a centrifugal compressor or pump, the combination with a blow-off valve, of a power piston, means for placing said power piston under the influence of the delivery pressure, a second power piston, means for placing said second power piston under the influence of the quantity of fluid flowing through the compressor or pump, an auxiliary pressure fluid power machine connected with the blow-off valve and means for controlling said auxiliary power machine from the two power pistons, whereby the blow-off valve is opened at all speeds whenever the point indicating the momentary delivery in the quantity-pressure diagram falls on that side of the stability limit curve where pumping or surging occurs.

8. In a centrifugal compressor or pump, the combination with a blow-off valve, of a power piston, means for placing said power piston under the influence of the delivery pressure, a second power piston, means for placing said second power piston under the influence of the quantity of fluid flowing through the compressor or pump, an auxiliary pressure fluid power machine connected with the blow-off valve, a controlling valve for said auxiliary power machine and means for transmitting the movement of both said power pistons to the controlling valve, whereby the blow-off valve is opened at all speeds whenever the point indicating the momentary delivery in the quantity-pressure diagram falls on that side of the stability limit curve where pumping or surging occurs.

9. In a centrifugal compressor or pump, the combination with a blow-off valve, of a power piston, means for placing said power piston under the influence of the delivery pressure, a second power piston, means for placing said second power piston under the influence of the quantity of fluid flowing through the compressor or pump, an auxiliary pressure fluid power machine connected with the blow-off valve, a controlling valve for said auxiliary power machine and a double lever for transmitting the movements of both said power pistons to the controlling valve, whereby the blow-off valve is opened at all speeds whenever the point indicating the momentary delivery in the quantity-pressure diagram falls on that side of the stability limit curve where pumping or surging occurs.

10. In a centrifugal compressor, an intake and a discharge line, a demand measuring device, a blow off valve in said discharge line, means operated from said demand measuring device for opening said blow off valve at a determined minimum volume and means to vary said determined minimum in accordance with the pressure in said discharge line.

11. In a centrifugal compressor having a discharge line, a passage connected with said compressor through which the demanded volume of fluid passes, a moving element connected with said passage and adapted to move in accordance with the flow therethrough, a blow off valve in said discharge line operatively connected with said moving element, and adapted to be opened thereby at a minimum volume of flow through said passage, and a second moving element adapted to be moved in accordance with the pressure, in said discharge line, said second element also having operative connection with said blow off valve to modify the action of said first moving element.

12. In a centrifugal compressor, an inlet and discharge line for said compressor, a demand measuring device in the inlet line of said compressor, a blow off valve in the discharge line of said compressor and a conduit for leading the blow off air back to the inlet of said compressor.

In testimony whereof I affix my signature in presence of two witnesses.

HANS GUYER.

Witnesses:
  CARL GUBLER,
  ARNOLD LEHNER.